United States Patent [19]

Burley

[11] 4,107,347

[45] Aug. 15, 1978

[54] METHOD OF MANUFACTURING A MILK CHOCOLATE

[75] Inventor: Victor George Burley, Tasmania, Australia

[73] Assignee: Cadbury Limited, Birmingham, England

[21] Appl. No.: 498,137

[22] Filed: Aug. 16, 1974

[30] Foreign Application Priority Data

Aug. 17, 1973 [GB] United Kingdom .............. 38960/73

[51] Int. Cl.² ............................................. A23G 1/00
[52] U.S. Cl. .................................. 426/660; 426/631; 426/584
[58] Field of Search .............................. 426/171–174, 426/185, 189, 356, 359, 631, 593, 658, 660

[56] References Cited

U.S. PATENT DOCUMENTS

| | | | |
|---|---|---|---|
| 2,209,202 | 7/1940 | Horne | 426/658 X |
| 2,328,791 | 9/1943 | Drury | 426/658 X |
| 2,452,770 | 11/1948 | Lang | 426/658 X |
| 3,126,283 | 3/1964 | Noznick | 426/359 X |
| 3,248,226 | 4/1966 | Stewart, Jr. | 426/359 X |
| 3,385,710 | 5/1968 | Reymond et al. | 426/173 X |
| 3,607,309 | 9/1971 | Olney et al. | 426/359 |
| 3,622,342 | 11/1971 | Rusoff | 426/359 |
| 3,769,030 | 10/1973 | Kleinert | 426/631 X |

OTHER PUBLICATIONS

Chem. Abstracts v. 75 108701s, Model Studies on Non-Enzymic browning reactions, 1971.
Chem. Abstracts v. 75 4281p, Non-enzymic browning, 1971.
Principles of Dairy Chemistry by Jenness et al., pub. by John Wiley and Sons, N. Y. 1959, pp. 346-357.

*Primary Examiner*—Frank Sever
*Attorney, Agent, or Firm*—Kane, Dalsimer, Kane, Sullivan and Kurucz

[57] ABSTRACT

A method of manufacturing a milk chocolate comprises the steps of heating an aqueous sugar solution, which may contain up to 5% by weight of glucose, to a temperature of 250° F to 320° F. The heated sugar solution is then immediately poured into milk powder in a heated melangeur and the resultant mixture is then processed to form milk chocolate. Anhydrous butter fat, cocoa mass and/or cocoa powder may be present with the milk powder when the heated sugar solution is added.

7 Claims, No Drawings

METHOD OF MANUFACTURING A MILK CHOCOLATE

This invention relates to a method of manufacturing a milk chocolate and has for its object to provide a method of manufacturing a milk chocolate using a milk powder to produce a milk chocolate having a flavour resembling milk chocolate produced by the so-called "crumb" process.

According to the present invention, there is provided a method of manufacturing a milk chocolate, comprising the steps of heating an aqueous sugar solution to a temperature of between 250° F and 320° F, mixing the resultant heated sugar solution with milk powder, and processing the resultant mixture with other chocolate making ingredients to form a milk chocolate.

The heated sugar may be mixed with the milk powder in the presence of anhydrous butter fat, cocoa mass, and/or cocoa powder.

It is preferred to employ small quantities of reducing sugar (up to 5%), e.g. glucose, in the aqueous sugar solution.

The invention will be described in further detail in the accompanying examples.

EXAMPLE 1

100 lbs of sugar was dissolved in water and the resulting solution heated and boiled until it attained a temperature of 295° F. The boiled sugar solution was then immediately poured into a mixture of 61.6 lbs of full cream milk powder and 24 lbs of cocoa mass held in a heated melangeur to be mixed, with heating, for 10 minutes. During this time, the temperature of the mix rose to not more than 230° F.

90.6% by weight of the above prepared mixture was mixed with 9.4% by weight of cocoa butter in a melangeur. When thoroughly mixed, the resultant mixture was ground to a smooth consistency on a set of refining rolls to produce a refined powder.

Lastly, the following ingredients were conched for 24 hours at a temperature not exceeding 130° F:
- 99.15% by weight refined powder (produced as above)
- 0.45% by weight lecithin
- 0.35% by weight cocoa butter
- 0.05% by weight flavouring to produce a milk chocolate having a flavour resembling that produced by the "crumb" process.

EXAMPLE 2

100 lbs of sugar was dissolved in water and the resulting solution heated and boiled until it attained a temperature of 295° F. The boiled sugar solution was then poured immediately into a mixture of 30.8 lbs of full cream milk powder, 8.0 lbs butter oil, 22.8 lbs skim milk powder and 24 lbs of cocoa mass held in a heated melangeur to be mixed, with heating, for ten minutes. During this time, the temperature of the mix rose to not more than 230° F.

90.6% by weight of the above prepared mixture was mixed with 9.4% by weight of cocoa butter in a melangeur. When thoroughly mixed, the resultant mixture was ground to a smooth consistency on a set of refining rolls to produce a refined powder.

Lastly, the following ingredients were conched for 24 hours at a temperature not exceeding 130° F:
- 99.15% by weight refined powder (produced as above)
- 0.45% by weight lecithin
- 0.35% by weight cocoa butter
- 0.05% by weight flavouring to produce a milk chocolate having a flavour resembling that produced by the "crumb" process.

EXAMPLE 3

100 lbs of sugar was dissolved in water and the resulting solution heated and boiled until it attained a temperature of 295° F. The boiled sugar solution was then immediately poured into a mixture of 44.3 lbs skim milk powder, 17.3 lbs butter oil and 24 lbs of cocoa mass held in a heated melangeur to be mixed, with heating, for ten minutes. During this time, the temperature of the mix rose to not more than 230° F.

90.6% by weight of the above prepared mixture was mixed with 9.4% by weight of cocoa butter in a melangeur. When thoroughly mixed, the resultant mixture was ground to a smooth consistency on a set of refining rolls to produce a refined powder.

Lastly, the following ingredients were conched for 24 hours at a temperature not exceeding 130° F:
- 99.15% by weight refined powder (produced as above)
- 0.45% by weight lecithin
- 0.35% by weight cocoa butter
- 0.05% by weight flavouring to produce a milk chocolate having a flavour resembling that produced by the "crumb" process.

EXAMPLE 4

95 lbs of sucrose and 6 lbs glucose syrup were dissolved in water and the resulting solution heated and boiled intil it attained a temperature of 295° F. The boiled sugar solution was then immediately added to the mixtures of milk powder and cocoa mass or cocoa as described in Examples 1, 2 and 3. The materials were then processed as described in Examples 1, 2 and 3.

EXAMPLE 5

Examples 1, 2, 3, 4 were repeated except that all or part of the cocoa mass was replaced with cocoa mass which had been previously mixed with water and then dried, possibly under vacuum, to about 2 – 3% by weight moisture content. Such a step helps to drive off undesirable flavours and may also reduce the subsequent conching time. The materials were then processed as described in Examples 1 to 4 above.

EXAMPLE 6

Examples 1, 2, 3, 4 were repeated except that all or part of the cocoa mass was replaced by cocoa mass which had been treated with an alkali aqueous solution and then dried to about 2–3% by weight moisture content possibly under vacuum. The materials were then processed as described in Examples 1 to 4 above.

EXAMPLE 7

100 lbs of sugar was dissolved, in water and the resulting solution heated and boiled until it attained a temperature of 295° F. The boiled sugar solution was then immediately poured into a mixture of 61.6 lbs of full cream milk powder and 12.3 lbs of cocoa powder (12% fat) held in a heated melangeur to be mixed, with heating for 10 minutes. During this time the temperature of the mix rose to not more than 230° F.

85.0% by weight of the above prepared mixture was mixed with 15.0% by weight of cocoa butter in a melangeur. When thoroughly mixed, the resultant mixture was ground to a smooth consistency on a set of refining rolls to produce a refined powder.

Lastly, the following ingredients were conched for 24 hours at a temperature not exceeding 130° F:

99.15% by weight refined powder (produced as above)
0.45% by weight lecithin
0.35% by weight cocoa butter
0.05% recipe flavouring to produce a milk chocolate having a flavour resembling that produced by the "crumb" process.

I claim:

1. A method of manufacturing a milk chocolate, comprising the steps of heating a solution consisting essentially of sugar and water to a temperature of between 250° F and 320° F, mixing the resultant heated sugar solution with a material selected from the group consisting of milk powder, milk powder and anhydrous butter fat, milk powder and cocoa mass and milk powder with cocoa powder and butter fat while the heated sugar solution is at a temperature of between 250° F and 320° F and by using a greater weight of sugar than milk powder, and processing the resultant mixture with other chocolate making ingredients to form a milk chocolate.

2. A method as claimed in claim 1, wherein the material selected is milk powder with anhydrous butter fat.

3. A method as claimed in claim 1 wherein the material selected is milk powder with cocoa powder and butter fat.

4. A method as claimed in claim 1, wherein the material selected is milk powder with cocoa mass.

5. A method as claimed in claim 1, wherein up to 5% by weight of a reducing sugar is employed in the aqueous sugar solution.

6. The method according to claim 1, wherein the processing step includes mixing said resultant mixture with cocoa butter.

7. A method of manufacturing a milk chocolate, comprising the steps of heating a solution consisting essentially of sugar and water to a temperature of between 250° F and 320° F, substantially immediately mixing the resultant heated sugar solution with a material including milk powder while the heated sugar solution is at a temperature of between 250° F and 320° F and by using a greater weight of sugar than milk powder, and processing the resultant mixture with other chocolate making ingredients to form a milk chocolate.

* * * * *